United States Patent [19]
Magerstedt et al.

[11] Patent Number: 5,840,791
[45] Date of Patent: Nov. 24, 1998

[54] LASER-MARKABLE POLYMER MOULDING COMPOSITIONS

[75] Inventors: Herbert Magerstedt, Moers; Frank Gerling, Düsseldorf, both of Germany

[73] Assignee: Bayer Aktiengesellschaft, Germany

[21] Appl. No.: 857,752

[22] Filed: May 15, 1997

[30] Foreign Application Priority Data

May 24, 1996 [DE] Germany .................. 196 20 993.5

[51] Int. Cl.⁶ ........................................ C08K 3/38
[52] U.S. Cl. ................. 524/405; 524/412; 524/413; 524/417; 430/200; 430/945
[58] Field of Search .................... 524/405, 412, 524/417, 413; 430/245

[56] References Cited

U.S. PATENT DOCUMENTS

| | | | |
|---|---|---|---|
| 4,130,538 | 12/1978 | Shutt | 524/405 |
| 4,959,406 | 9/1990 | Foltin et al. | 524/413 |
| 4,972,015 | 11/1990 | Carico et al. | 524/417 |
| 4,981,895 | 1/1991 | Buchert et al. | 524/405 |
| 5,053,440 | 10/1991 | Schueler et al. | 524/413 |
| 5,063,137 | 11/1991 | Kiyonari et al. | 524/417 |
| 5,137,958 | 8/1992 | Matsunami et al. | 524/405 |
| 5,367,011 | 11/1994 | Walsh | 524/417 |
| 5,441,997 | 8/1995 | Walsh et al. | 524/417 |
| 5,489,639 | 2/1996 | Faber et al. | 524/417 |
| 5,496,880 | 3/1996 | Heuseveldt et al. | 524/417 |
| 5,599,869 | 2/1997 | Kurz | 524/417 |
| 5,648,415 | 7/1997 | Hoeks et al. | 524/405 |

FOREIGN PATENT DOCUMENTS

| | | |
|---|---|---|
| 04634 | 10/1979 | European Pat. Off. . |
| 0 190 997 | 8/1986 | European Pat. Off. . |
| 0 400 305 | 12/1990 | European Pat. Off. . |
| 0675001 | 10/1995 | European Pat. Off. . |
| 39 17 294 A1 | 11/1990 | Germany . |
| 3917294 | 11/1990 | Germany . |
| 4143258 | 1/1993 | Germany . |
| 41 43 258 A1 | 7/1993 | Germany . |
| 56-135543 | 10/1981 | Japan . |
| 61-155477 | 7/1986 | Japan . |
| 3-153747 | 7/1991 | Japan . |
| 04-28753 | 1/1992 | Japan . |

OTHER PUBLICATIONS

Database WPI Section Ch, Week 9713, Derwent Publications Ltd., London,GB; & JP 09 020 855 A (Teijin Ltd.) Jan. 21, 1997.

Database WPI Section Ch, Week 9424, Derwent Publications Ltd., London,GB; & JP 06 136 273 A (GE Plastics Japan Ltd) May 17. 19947.

Database WPI Section Ch, Week 9721, Derwent Publications Ltd., London,GB; & JP 09 071 726 A (Teijin Ltd.) Mar. 18, 1997.

*Primary Examiner*—Veronica P. Hoke
*Attorney, Agent, or Firm*—Connolly & Hutz

[57] ABSTRACT

Laser-markable thermoplastic moulding compositions are disclosed which contain thermoplastic polymers,
  boric anhydride, and optionally,
  fillers and reinforcing materials,
  flame retardant additives,
  elastomer modifiers,
  antimony trioxide, and
  copper(II) pyrophosphate hydrate.

5 Claims, No Drawings

LASER-MARKABLE POLYMER MOULDING COMPOSITIONS

This invention relates to thermoplastic polymer moulding compositions having a certain additive system and to mouldings suitable for laser marking produced from these thermoplastic moulding compositions.

Applying patterns, letters, numbers and/or images by means of laser beam marking systems in order to identify and decorate plastics mouldings is becoming increasingly significant. Apart from the economic advantages in comparison with conventional marking methods, laser marking offers great flexibility with regard to typeface, type size and design, irrespective of batch size. Providing markings on electrical/electronic components, key caps, casings and identity cards is a classic application for laser marking.

The following options for providing marks on plastics by means of laser marking are known:

1. Dark characters on a light background

A polymer matrix is coloured with light colorants (pigments or dyes). Absorption of laser energy during laser marking results in partial carbonisation of the polymer matrix/colorant. This produces a dark discoloration of the light polymer matrix. This behaviour is limited to polymers which have a tendency to carbonise.

The contrast ratios achievable in this manner are inadequate for many areas of application.

EP-A 0 190 997 describes the addition of colorants which change colour by absorbing laser energy. Polybutylene terephthalate is thus, for example, coloured red with iron oxide. Laser marking produces dark characters on a red background. The contrast ratio has proved inadequate.

2. Light characters on a dark background:

Polymers, colorants and additives having a tendency to foam by absorbing laser energy have proved successful for this type of marking. Foaming results in the formation of light marks on a dark background. The achievable contrast ratios are inadequate for many areas of application.

Laser-markable moulding compositions containing copper(II) hydroxide phosphate or molybdenum(VI) oxide as additives are known from EP-A 400 305.

The present invention relates to polymer moulding compositions which, on absorbing laser energy, produce dark characters on a light background with a very high contrast ratio.

It has surprisingly been found that polymer moulding compositions which contain boric anhydride alone or in combination with copper pyrophosphate hydrate or antimony trioxide result in moulding compositions in which dark characters on a light background may be achieved in the polymer matrix by the absorption of laser energy. Different grey levels may be obtained by varying the laser energy and/or the marking speed.

The present invention accordingly provides thermoplastic moulding compositions comprising A) 99.995 to 30, preferably 99.97 to 35, in particular 99.95 to 40 parts by weight of thermoplastic polymer, B) 0.005 to 3.0, preferably 0.01 to 1.5 parts by weight of boric anhydride, C) 0 to 50 parts by weight of fillers and reinforcing materials, D) 0 to 60 parts by weight of flame retardant additives, E) 0 to 30, preferably 0 to 25 parts by weight of elastomer modifiers, F) 0 to 8 parts by weight of antimony trioxide, G) 0 to 3, preferably 0 to 1.5 parts by weight of copper(II) pyrophosphate hydrate.

The present invention also provides the use of the above-stated thermoplastic moulding compositions for the production of mouldings or moulded parts which are marked by means of laser energy and the mouldings produced therefrom.

The present invention also provides a process for marking mouldings by means of laser energy.

Conventional commercial laser systems, preferably Nd:YAG solid-state lasers, may be used as the energy source. Wavelength may be between 193 and 10600 nm, preferably between 532 and 1064 nm.

The moulding compositions used according to the invention may be used to apply optical information in the form of patterns, graphics, numbers, letters, lettering, images (for example passport pictures, portraits, photographs) etc. by means of laser energy, for example by laser beam marking systems.

Photographic images may thus, for example, be transferred onto the moulding compositions used according to the invention.

Component A

Polymers or copolymers, for example based on polyalkylene terephthalates, aromatic polyesters, polyamide, polycarbonate, polyacrylate, polymethacrylate, ABS graft polymers, polyolefins such as polyethylene or polypropylene, polystyrene, polyvinyl chloride, polyoxymethylene, polyimide, polyethers and polyether ketones, which may be used individually or as a blend of various polymers, are suitable as the polymer matrix.

For the purposes of the invention, polyalkylene terephthalates are reaction products prepared from aromatic dicarboxylic acids or the reactive derivatives thereof (for example dimethyl esters or anhydrides) and aliphatic, cycloaliphatic or araliphatic diols and mixtures of these reaction products.

Preferred polyalkylene terephthalates may be produced from terephthalic acid (or the reactive derivatives thereof) and aliphatic or cycloaliphatic diols having 2 to 10 C atoms using known methods (*Kunststoff-Handbuch*, volume VIII, pp. 695 et seq., Karl-Hanser Verlag, Munich 1973).

Preferred polyalkylene terephthalates contain at least 80, preferably 90 mol. %, relative to the dicarboxylic acid, of terephthalic acid residues and at least 80, preferably at least 90 mol. %, relative to the diol component, of ethylene glycol and/or 1,4-butanediol residues.

The preferred polyalkylene terephthalates may contain, in addition to terephthalic acid residues, up to 20 mol. % of residues of other aromatic dicarboxylic acids having 8 to 14 C atoms or of aliphatic dicarboxylic acids having 4 to 12 C atoms, such as residues of phthalic acid, isophthalic acid, 2,6-naphthalenedicarboxylic acid, 4,4'-diphenyldicarboxylic, acid, succinic, adipic, sebacic acid, azelaic acid, cyclohexanediacetic acid.

The preferred polyalkylene terephthalates may contain, in addition to ethylene glycol or 1,4-butanediol residues, up to 20 mol. % of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-methyl-2,4-pentanediol, 2-methyl-2,4-pentanediol, 2,2,4-trimethyl-1,3-pentanediol and 1,6,2-ethyl-1,3-hexanediol, 2,2-diethyl-1,3-propanediol, 2,5-hexanediol, 1,4-di-(β-hydroxyethoxy)benzene, 2,2-bis-(4-hydroxycyclohexyl)propane, 2,4-dihydroxy-1,1,3,3-tetramethylcyclobutane, 2,2-bis-(3-β-hydroxyethoxyphenyl)propane and 2,2-bis-(4-hydroxypropoxy-phenyl)propane DE-OS 24 07 674, 24 07 776, 27 15 932).

The polyalkylene terephthalates may be branched by incorporating relatively small quantities of tri- or tetrahydric alcohols or tri- or tetrabasic carboxylic acid, as are described, for example, in DE-OS 19 00 270 and U.S. Pat. No. 3,692,744. Examples of preferred branching agents are trimesic acid, trimellitic acid, trimethylolethane, trimethylolpropane and pentaerythritol.

It is advisable to use no more than 1 mol. % of the branching agent, relative to the acid component.

Particularly preferred polyalkylene terephthalates are those produced solely from terephthalic acid and the reactive derivatives thereof (for example the dialkyl esters thereof) and ethylene glycol and/or 1,4-butanediol (polyethylene and polybutylene terephthalate) and mixtures of these polyalkylene terephthalates.

Preferred polyalkylene terephthalates also include copolyesters produced from at least two of the above-stated acid components and/or from at least two of the above-stated alcohol components, with particularly preferred copolyesters being poly(ethylene glycol/1,4-butanediol) terephthalates.

The polyalkylene terephthalates preferably used as component A generally have an intrinsic viscosity of approx. 0.4 to 1.5 dl/g, preferably of 0.5 to 1.3 dl/g, in each case measured in phenol/o-dichlorobenzene (1:1 parts by weight) at 25° C.

For the purposes of this invention, aromatic polycarbonates are taken to be homopolycarbonates and mixtures of these polycarbonates based on, for example, at least one of the following diphenols:

hydroquinone,
resorcinol,
dihydroxydiphenyls,
bis-(hydroxyphenyl)alkanes,
bis-(hydroxyphenyl)cycloalkanes,
bis-(hydroxyphenyl) sulphides,
bis-(hydroxyphenyl) ethers,
bis-(hydroxyphenyl) ketones,
bis-(hydroxyphenyl) sulphones,
bis-(hydroxyphenyl) sulphoxides,
$\alpha,\alpha'$-bis-(hydroxyphenyl)diisopropylbenzenes,
together with the ring-alkylated and ring-halogenated derivatives thereof.

These and further suitable diphenols are described, for example, in U.S. Pat. Nos. 3,028,365, 2,999,835, 3,148,172, 2,275,601, 2,991,283, 3,271,367, 3,062,781, 2,970,131 and 2,999,846, in German published patent applications DE-OS 1 570 703, DE-OS 2 063 050, DE-OS 2 063 052, DE-OS 2 211 956, DE-OS 2 211 957, in French patent 1 561 518 and in the monograph "H. Schnell, Chemistry and Physics of Polycarbonates, Interscience Publishers, New York, 1964".

Preferred diphenols are, for example:

2,2-bis-(4-hydroxyphenyl)propane,
1,1-bis-(4-hydroxyphenyl)cyclohexane,
2,2-bis-(3,5-dichloro-4-hydroxyphenyl)propane,
2,2-bis-(3,5-dibromo-4-hydroxyphenyl)propane,
2,2-bis-(3,5-dimethyl-4-hydroxyphenyl)propane,
bis-(3,5-dimethyl-4-hydroxyphenyl)methane,
bis-(4-hydroxyphenyl) sulphide,
1,1-bis-(4-hydroxyphenyl)-3,3,5-trimethylcyclohexane.

The diphenols may be used both individually and as a mixture. Particularly preferred aromatic polycarbonates are polycarbonates based in 2,2-bis-(4-hydroxyphenyl)propane or on one of the other diphenols stated to be preferred. Very particularly preferred polycarbonates are those based on 2,2-bis-(4-hydroxyphenyl)propane, 2,2-bis-(3,5-dimethyl-4-hydroxyphenyl)propane or 1,1-bis-(4-hydroxyphenyl)-3,3,5-trimethylcyclohexane or mixtures of 2,2-bis-(4-hydroxyphenyl)propane and 1,1-bis-(4-hydroxyphenyl)-3,3,5-trimethylcyclohexane.

The aromatic polycarbonates may be produced using known processes, for example by melt transesterification of a suitable bisphenol with diphenyl carbonate or in solution from bisphenols and phosgene. The solution may be homogeneous (pyridine process) or heterogeneous (two-phase interface process) (c.f. H. Schnell, Chemistry and Physics of Polycarbonates, Polymer Reviews, volume IX pp. 33 et seq., Interscience Publ. 1964).

The aromatic polycarbonates generally have average molecular weights $M_W$ of approx. 10000 to 200000, preferably of 20000 to 80000 (determined by gel chromatography after prior calibration).

For the purposes of the invention, copolycarbonates are in particular polydiorganosiloxane/polycarbonate block copolymers having an average molecular weight $M_W$ of approx. 10000 to 200000, preferably of 20000 to 80000 (determined by gel chromatography after prior calibration) and having a content of aromatic carbonate structural units of approximately 75 to 97.5 wt. %, preferably of 85 to 97 wt. % and a content of polydiorganosiloxane structural units of approximately 25 to 2.5 wt. %, preferably of 15 to 3 wt. %, wherein the block copolymers are produced from polydiorganosiloxanes containing $\alpha,\omega$-bishydroxyaryloxy end groups and having a degree of polymerisation $P_n$ of 5 to 100, preferably of 20 to 80.

The polydiorganosiloxane/polycarbonate block copolymers may also be a mixture of polydiorganosiloxane/polycarbonate block copolymers with conventional thermoplastic polycarbonates containing no polysiloxane, wherein the total content of polydiorganosiloxane structural units in this mixture is approx. 2.5 to 25 wt. %.

Such polydiorganosiloxane/polycarbonate block copolymers are characterised in that they contain in the polymer chain, on the one hand, aromatic carbonate structural units (1) and, on the other, polydiorganosiloxanes containing aryloxy end groups (2),

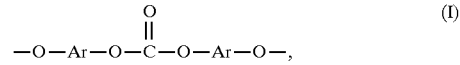

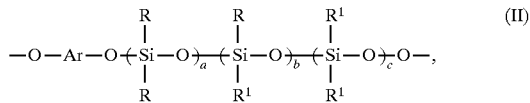

wherein
Ar means identical or different aryl residues from diphenols and
R and $R^1$ are identical or different and mean linear alkyl, branched alkyl, alkenyl, halogenated linear alkyl, halogenated branched alkyl, aryl or halogenated aryl, but preferably methyl, and
the number of diorganosiloxy units n=a+b+c is 5 to 100, preferably 20 to 80.

Akyl is, for example, $C_1$–$C_{20}$ alkyl in the above formula (2), alkenyl is, for example, $C_2$–$C_6$ alkenyl in the above formula (2); aryl is $C_6$–$C_{14}$ aryl in the above formula (2). In the above formula, halogenated means partially or completely chlorinated, brominated or fluorinated.

Examples of alkyls, akenyls, aryls, halogenated alkyls and halogenated aryls are methyl, ethyl, propyl, n-butyl, tert.- butyl, vinyl, phenyl, naphthyl, chloromethyl, perfluorobutyl, perfluorooctyl and chlorophenyl.

Such polydiorganosiloxane/polycarbonate block copolymers are known, for example, from U.S. Pat. No 3,189,662, U.S. Pat. No. 3,821,325 and U.S. Pat. No. 3,832,419.

Preferred polydiorganosiloxane/polycarbonate block copolymers are produced by reacting polydiorganosiloxanes containing α,ω-bishydroxyarylexy end groups with other diphenols, optionally together with conventional quantities of branching agents, for example using the two-phase interface process (c.f. in this connection H. Schnell, *Chemistry and Physics of Polycarbonates, Polymer Rev.*, volume IX, pp. 27 et seq., Interscience Publishers, New York 1964), wherein the ratio of difunctional phenolic reactants is selected in each case in such a manner that the content according to the invention of aromatic carbonate structural units and diorganosiloxy units is achieved.

Such polydiorganosiloxanes containing α,ω-bishydroxyaryloxy end groups are known, for example, from U.S. Pat. No. 3,419,634.

For the purposes of the invention, ABS graft polymers are graft polymers prepared from A.1) 5 to 95, preferably 30 to 80 parts by weight of a mixture of A.1.1) 50 to 95 parts by weight of styrene, α-methylstyrene, styrene ring-substituted by halogen or methyl, $C_1$–C8 alkyl methacrylate, in particular methyl methacrylate, $C_1$–$C_8$ alkyl acrylate, in particular methyl acrylate or mixtures of these compounds and A.1.2) 5 to 50 parts by weight of acrylonitrile, methylacrylonitrile, $C_1$–C8 alkyl methacrylates, in particular methyl methacrylate, $C_1$–$C_8$ alkyl acrylate, in particular methyl acrylate, maleic anhydride, $C_1$–$C_4$ alkyl- or phenyl-N-substituted maleimides or mixtures of these compounds on A.2) 5 to 95, preferably 20 to 70 parts by weight of butadiene, polybutadiene or butadiene/styrene copolymer having a glass transition temperature of below −10° C.

Such graft polymers are described, for example, in DE-OS 2 035 390 (=U.S. Pat. No. 3,644,574) or in DE-OS 2 248 242 (=GB 1 409 275).

Since, as is known, the graft monomers are not necessarily completely grafted onto the grafting backbone, copolymers of the graft monomers are formed. The term ABS graft polymers should also be taken to include these products also containing these copolymers as a result of the polymerisation reaction.

The average particle diameter $d_{50}$ of the ABS graft polymer is generally 0.5 to 5 nm, preferably 0.1 to 2 nm. Average particle diameter $d_{50}$ is the diameter both above and below which are found 50 wt. % of the particles. This value may be determined by ultracentrifuge measurements (W. Scholtan, H. Lange, Kolloid, Z. *Polymere* 250 (1972), 782–796).

Polyolefins are polyethylene, polypropylene, poly-1-butene and polymethylpentene, which may still contain small quantities of copolymerised unconjugated dienes. These polymers are known and described in *Roempp's Chemielexikon*, 8th edition 1987, volume 5, p. 3307 and in the literature cited therein. Polypropylene is preferred.

The polyamides used in the thermoplastic polyamide moulding compositions are generally aliphatic polyamides or polyamides having a predominantly aliphatic content. Preferred polyamides are polyamide or polyamide-6,6 or copolyamides or polyamide-6 with diamines (preferably $C_4$–$C_{16}$, in particular $C_4$–$C_8$ alkylene-diamines) and dicarboxylic acids (preferably $C_4$–$C_{12}$, in particular $C_4$–$C_8$ alkylene-dicarboxylic acids) or polyamides-6,6 having a maximum comonomer content of 20 wt. %.

Component B

Boric anhydride or boron trioxide [$B_2O_3$] is generally known and commercially available, for example, from Aldrich.

Component C

Fillers and reinforcing materials which may be used are inter alia glass fibres, glass beads, mica, silicates, quartz, talcum, titanium dioxide, wollastonite, which may also be surface-treated. Preferred reinforcing materials are conventional commercial glass fibres. Glass fibres, which generally have a fibre diameter of between 8 and 14 µm, may be used as continuous fibres or as chopped or ground glass fibres, wherein the fibres may be provided with a suitable sizing system and a coupling agent or coupling system based on silane. Preferably, 8 to 45, in particular 10 to 40 parts by weight of fillers and reinforcing materials are added to the mixture.

Component D

Suitable flame retardant additives are conventional commercial organic compounds or halogen compounds with synergists or conventional commercial organic nitrogen compounds or organic/inorganic phosphorus compounds. Mineral flame retardant additives, such as Mg hydroxide or Ca Mg carbonate hydrate may also be used.

The moulding compositions according to the invention may contain up to 20, preferably 3 to 18, in particular 6 to 15 parts by weight of halogenated compounds and up to 8, preferably 2 to 6 parts by weight of antimony compounds, in particular antimony trioxide or antimony pentoxide.

Halogenated, in particular brominated and chlorinated, organic compounds which may be cited by way of example are;

ethylene-1,2-bistetrabromophthalimide,
epoxidated tetrabromobisphenol A resin,
tetrabromobisphenol A oligocarbonate,
tetrachlorobisphenol A oligocarbonate,
pentabromopolyacrylate,
brominated polystyrene.

Pentabromopolyacrylate generally has an average molecular weight $M_W$ (weight average) of 10000 to 200000, brominated polystyrene generally of 10000 to 500000.

Epoxidated tetrabromobisphenol A and tetrabromobisphenol A oligocarbonate are preferably used.

Epoxidated tetrabromobisphenol A is a known diepoxy resin having a molecular weight of approx. 350 to approx. 2100, preferably of 360 to 1000, particularly preferably of 370 to 400, which substantially consists of at least one condensation product of bisphenol A and epihalohydrin and is described by the formula (I)

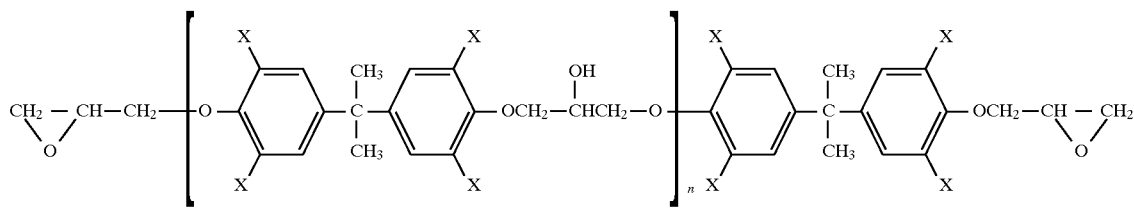

in which X denotes hydrogen or bromine and n is a mean value between 0 and less than 2.3 (c.f. for example EP-A 180 471).

Tetrabromobisphenol A oligocarbonate or tetrachlorobisphenol A oligocarbonate is described by the formula (II), wherein the oligomers are terminated either with phenol or with tribromophenol or trichlorophenol:

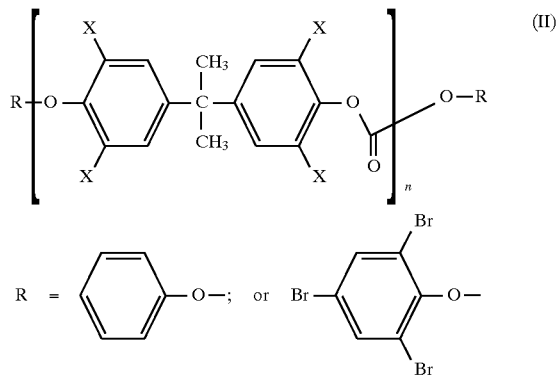

wherein X denotes hydrogen, bromine or chlorine, n is an average value between 4 and 7.

Tetrabromo(chloro)bisphenol A oligocarbonate is known and may be produced using known processes.

Suitable organic phosphorus compounds are the phosphorus compounds according to EP-A 345 522 (U.S. Pat. No. 061,745) or DE-OS 43 28 656.9 in the quantities described therein, for example triphenyl phosphate, oligomeric phosphates, resorcinol diphosphate or a mixture thereof.
Component E Elastomer modifiers which may be considered are conventional commercial EP(D)M rubbers, graft rubbers based on butadiene, styrene, acrylonitrile (c.f., for example, the ABS graft polymers described above), acrylate rubbers, thermoplastic polyurethanes or EVA copolymers with or without functional coupling groups.

The moulding compositions according to the invention may contain conventional additives, such as lubricants and mould release agents, nucleating agents, antistatic agents, stabilisers.

The moulding compositions according to the invention prepared from the particular components and optionally further known additives such as stabilisers, dyes, pigments, lubricants and mould release agents, reinforcing materials, nucleating agents and antistatic agents may be produced by mixing the particular constituents in a known manner and melt-compounding or melt-extruding them at temperatures of 180° C. to 330° C. in conventional units such as internal kneaders, extruders, twin-screw extruders.
Component F Antimony trioxide is generally known and may be obtained commercially from, for example, Campine.
Component G Copper pyrophosphate hydrate [$Cu_2P_2O_7$—$H_2O$] is generally known and is commercially obtainable from, for example, Aldrich or Riedel de Haen.

The moulding compositions according to the invention may contain conventional additives, such as lubricants and mould release agents, nucleating agents, antistatic agents, stabilisers.

The moulding compositions according to the invention prepared from the particular components and optionally further known additives such as stabilisers, dyes, pigments, lubricants and mould release agents, reinforcing materials, nucleating agents and antistatic agents may be produced by mixing the particular constituents in a known manner and melt-compounding or melt-extruding them at temperatures of 180° C. to 330° C. in conventional units such as internal kneaders, extruders, twin-screw extruders.

EXAMPLES

The intrinsic viscosity of polybutylene terephthalate is measured in phenol/o-dichlorobenzene (1:1 parts by weight) at 25° C.

Example 1 (According to the Invention)*

| | |
|---|---|
| 0.100 parts by weight | of boric anhydride are physically mixed with a compound prepared from |
| 86.225 parts by weight | of polybutylene terephthalate, intrinsic viscosity I.V. = 0.90–0.95 dl/g |
| 10.000 parts by weight | of Makrolon ® 2800 natural (bisphenol A based poolcarbonate, Bayer AG) |
| 3.200 parts by weight | of $Sb_2O_3$ |
| 0.475 parts by weight | of stabilisers and nucleating agents | and then compounded by means of an extruder. The resultant pellets are converted into mouldings in an injection moulding machine.

Example 2 (According to the Invention)*

| | |
|---|---|
| 0.500 parts by weight | of boric anhydride are physically mixed with a compound prepared from |
| 85.825 parts by weight | of polybutylene terephthalate, intrinsic viscosity I.V. = 0.90–0.95 dl/g |
| 10.000 parts by weight | of Makrolon ® 2800 natural, Bayer AG |
| 3.200 parts by weight | of $Sb_2O_3$ |
| 0.475 parts by weight | of stabilisers and nucleating agents | and then compounded by means of an extruder. The resultant pellets are converted into sheets in an injection moulding machine.

Example 3 (According to the Invention)*

| | |
|---|---|
| 0.100 parts by weight | of boric anhydride are physically mixed with a compound prepared from |
| 89.025 parts by weight | of polybutylene terephthalate, intrinsic viscosity I.V. = 0.90–0.95 dl/g |
| 10.000 parts by weight | of Makrolon ® 2800 natural, Bayer AG |

-continued

| | |
|---|---|
| 0.400 parts by weight | of copper pyrophosphate hydrate |
| 0.475 parts by weight | of stabilisers and nucleating agents | and then compounded by means of an extruder. The resultant pellets are converted into sheets in an injection moulding machine.

Example 4 (According to the Invention)*

| | |
|---|---|
| 0.500 parts by weight | of boric anhydride are physically mixed with a compound prepared from |
| 88.625 parts by weight | of polybutylene terephthalate, intrinsic viscosity I.V. = 0.90–0.95 dl/g |
| 10.000 parts by weight | of Makrolon ® 2800 natural, Bayer AG |
| 0.400 parts by weight | of copper pyrophosphate hydrate |
| 0.475 parts by weight | of stabilisers and nucleating agents | and then compounded by means of an extruder. The resultant pellets are converted into sheets in an injection moulding machine.

* Examples 1 to 4 are coloured grey using 1.1725 parts by weight of a mixture of Lichtgelb 3R, Makrolexorange 3G, Bayferrox 130M, Bayertitan RFK 3 and Flammruβ 101.

Example 5 (According to the Invention)

| | |
|---|---|
| 0.100 parts by weight | of boric anhydpde are physically mixed with a compound prepared from |
| 99.325 parts by weight | of polybutylene terephthalate, intrinsic viscosity I.V. = 0.90–0.95 dl/g |
| 0.200 parts by weight | of Makrolexgelb 3G, Bayer AG |
| 0.375 parts by weight | of stabilisers and nucleating agents | and then compounded by means of an extruder. The resultant pellets are converted into sheets in an injection moulding machine.

Example 6 (According to the Invention)

| | |
|---|---|
| 0.100 parts by weight | of boric anhydride are physically mixed with a compound prepared from |
| 96.125 parts by weight | of polybutylene terephthalate, intrinsic viscosity I.V. = 0.90–0.95 dl/g |
| 0.200 parts by weight | of Makrolexgelb 3G, Bayer AG |
| 3.200 parts by weight | of $Sb_2O_3$ |
| 0.375 parts by weight | of stabilisers and nucleating agents | and then compounded by means of an extruder. The resultant pellets are converted into sheets in an injection moulding machine.

Example 7 (According to the Invention)

| | |
|---|---|
| 0.100 parts by weight | of boric anhydride are physically mixed with a compound prepared from |
| 96.125 parts by weight | of polybutylene terephthalate, intrinsic viscosity I.V. = 0.90–0.95 dl/g |
| 0.200 parts by weight | of Makrolexblau 3G, Bayer AG |
| 3.200 parts by weight | of $Sb_2O_3$ |
| 0.375 parts by weight | of stabilisers and nucleating agents | and then compounded by means of an extruder. The resultant pellets are converted into sheets in an injection moulding machine.

Example 8 (According to the Invention)

| | |
|---|---|
| 0.100 parts by weight | of boric anhydride are physically mixed with a compound prepared from |
| 96.125 parts by weight | of polybutylene terephthalate, intrinsic viscosity I.V. = 0.90–0.95 dl/g |
| 0.200 parts by weight | of Makrolexgrün 3G, Bayer AG |
| 3.200 parts by weight | of $Sb_2O_3$ |
| 0.375 parts by weight | of stabilisers and nucleating agents | and then compounded by means of an extruder. The resultant pellets are converted into sheets in an injection moulding machine.

Example 9 (According to the Invention)

| | |
|---|---|
| 0.100 parts by weight | of boric anhydride are physically mixed with a compound prepared from |
| 96.125 parts by weight | of polybutylene terephthaiate, intrinsic viscosity I.V. = 0.90–0.95 dl/g |
| 0.200 parts by weight | of Makrolexviolett RR, Bayer AG |
| 3.200 parts by weight | of $Sb_2O_3$ |
| 0.375 parts by weight | of stabilisers and nucleating agents | and then compounded by means of an extruder. The resultant pellets are converted into sheets in an injection moulding machine.

Example 10 (According to the Invention)

| | |
|---|---|
| 0.100 parts by weight | of boric anhydride are physically mixed with a compound prepared from |
| 96.125 parts by weight | of polybutylene terephthalate, intrinsic viscosity I.V. = 0.90–0.95 dl/g |
| 0.200 parts by weight | of Makrolexrot 5B, Bayer AG |
| 3.200 parts by weight | of $Sb_2O_3$ |
| 0.375 parts by weight | of stabilisers and nucleating agents | and then compounded by means of an extruder. The resultant pellets are converted into sheets in an injection moulding machine.

Example 11 (According to the Invention)

| | |
|---|---|
| 0.100 parts by weight | of boric anhydride are physically mixed with a compound prepared from |
| 99.425 parts by weight | of polybutylene terephthalate, intrinsic viscosity I.V. = 0.90–0.95 dl/g |
| 0.475 parts by weight | of stabilisers and nucleating agents | and then compounded by means of an extruder. The resultant pellets are converted into sheets in an injection moulding machine.

Example 12 (According to the Invention)

| | |
|---|---|
| 0.050 parts by weight | of boric anhydride are physically mixed with a compound prepared from |
| 99.475 parts by weight | of polybutylene terephthalate, intrinsic viscosity I.V. = 0.90–0.95 dl/g |
| 0.475 parts by weight | of stabilisers and nucleating agents | and then compounded by means of an extruder. The resultant pellets are converted into sheets in an injection moulding machine.

Example 13 (According to the Invention)

| | |
|---|---|
| 0.010 parts by weight | of boric anhydride are physically mixed with a compound prepared from |
| 99.515 parts by weight | of polybutylene terephthalate, intrinsic viscosity I.V. = 0.90–0.95 dl/g |
| 0.475 parts by weight | of stabilisers and nucleating agents | and then compounded by means of an extruder. The resultant pellets are converted into sheets in an injection moulding machine.

Example 14 (Comparison)

| | |
|---|---|
| 99.525 parts by weight | of polybutylene terephthalate, intrinsic viscosity I.V. = 0.90–0.95 dl/g |
| 0.475 parts by weight | of stabilisers and nucleating agents | are physically mixed and then compounded by means of an extruder. The resultant pellets are converted into sheets in an injection moulding machine.

Example 15 (According to the Invention)

| | |
|---|---|
| 0.1 parts by weight | of boric anhydride are physically mixed with a compound prepared from |
| 99.9 parts by weight | of polyamide Durethan B 30 SK (PAG), Bayer AG | and then compounded by means of an extruder. The resultant pellets are converted into sheets in an injection moulding machine.

Example 16 (According to the Invention)

| | |
|---|---|
| 0.05 parts by weight | of boric anhydride are physically mixed with a compound prepared from |
| 99.95 parts by weight | of polyamide Durethan B 30 SK, Bayer AG | and then compounded by means of an extruder. The resultant pellets are converted into sheets in an injection moulding machine.

Example 17 (According to the Invention)

| | |
|---|---|
| 0.01 parts by weight | of boric anhydride are physically mixed with a compound prepared from |
| 99.99 parts by weight | of polyamide Durethan B 30 SK, Bayer AG | and then compounded by means of an extruder. The resultant pellets are converted into sheets in an injection moulding machine.

Example 18 (Comparison)

| | |
|---|---|
| 100 parts by weight | of Durethan B 30 SK, Bayer AG | are converted into sheets in an injection moulding machine. The sheets were marked by means of an Nd:YAG laser.

Example 19 (According to the Invention)

| | |
|---|---|
| 0.100 parts by weight | of boric anhydride are physically mixed with a compound prepared from |
| 89.325 parts by weight | of polybutylene terephthalate, intrinsic viscosity I.V. = 0.90–0.95 dl/g |
| 10.000 parts by weight | of Makrolon ® 2800 natural, Bayer AG |
| 0.200 parts by weight | of Lichtgelb 6R, Bayer AG |
| 0.375 parts by weight | of stabilisers and nucleating agents | and then compounded by means of an extruder. The resultant pellets are converted into sheets in an injection moulding machine.

Example 20 (According to the Invention)

| | |
|---|---|
| 0.100 parts by weight | of boric anhydride are physically mixed with a compound prepared from |
| 86.125 parts by weight | of polybutylene terephthalate, intrinsic viscosity I.V. = 0.90–0.95 dl/g |
| 10.000 parts by weight | of Makrolon ® 2800 natural, Bayer AG |
| 0.200 parts by weight | of Lichtgelb 6R, Bayer AG |
| 3.200 parts by weight | of $Sb_2O_3$ |
| 0.375 parts by weight | of stabilisers and nucleating agents | and then compounded by means of an extruder. The resultant pellets are converted into sheets in an injection moulding machine.

Example 21 (Comparison)

A compound prepared from

| | |
|---|---|
| 86.225 parts by weight | of polybutylene terephthalate, intrinsic viscosity I.V. = 0.90–0.95 dl/g |
| 10.000 parts by weight | of Makrolon ® 2800 natural, Bayer AG |
| 0.200 parts by weight | of Lichtgelb 6R, Bayer AG |
| 3.200 parts by weight | of $Sb_2O_3$ |
| 0.375 parts by weight | of stabilisers and nucleating agents | is physically mixed and then compounded by means of an extruder. The resultant pellets are converted into sheets in an injection moulding machine.

Example 22 (Comparison)

A compound prepared from

| | |
|---|---|
| 89.425 parts by weight | of polybutylene terephthalate, intrinsic viscosity I.V. = 0.90–0.95 dl/g |
| 10.000 parts by weight | of Makrolon ® 2800 natural, Bayer AG |
| 0.200 parts by weight | of Lichtgelb 6R, Bayer AG |
| 0.375 parts by weight | of stabilisers and nucleating agents | is physically mixed and then compounded by means of an extruder. The resultant pellets are converted into sheets in an injection moulding machine.

All the sheets were marked by means of an Nd:YAG laser.

Depending upon the intensity of the laser beam energy and marking speed, black, dark or dark grey characters are produced on a light or coloured background:

Results from Examples 1 to 22

| | Examples | | | | | | | | | | |
|---|---|---|---|---|---|---|---|---|---|---|---|
| | 1 | 2 | 3 | 4 | 5 | 6 | 7 | 8 | 9 | 10 | 11 |
| | | | | | Tests according to the invention | | | | | | |
| Background colour | grey | grey | grey | grey | yellow | yellow | blue | green | violet | red | light |
| Marking | dark | very dark | dark | very dark | dark | very dark | very dark | very dark | very dark | very dark | very dark |
| Contrast rating | 1 | 1+ | 2(+) | 1− | 3− | 1− | 2+ | 2 | 2− | 2− | 1 |

| | Examples | | | | | | | | | | |
|---|---|---|---|---|---|---|---|---|---|---|---|
| | 12 | 13 | 14 | 15 | 16 | 17 | 18 | 19 | 20 | 21 | 22 |
| | invention | | comp. | | invention | | comp. | | invention | | comparisons |
| Background colour | light | light | light | light | light | light | light | yellow | yellow | yellow | yellow |
| Marking | dark | dark | light grey | very dark | dark | dark | light grey | dark | very dark | dark | light grey |
| Contrast rating | 1− | 2 | 5 | 1 | 1− | 2 | 4− | 1− | 1 | 2 | 5 |

Ratings:
1 = very good
2 = good
3 = satisfactory
4 = adequate
5 = unacceptable
+ = slightly better than rating
− = slightly worse than rating In comparison with the comparative Examples, all the Examples according to the invention exhibit improved surface quality and more abrasion resistant marking.

Marking was performed with an RSM Base Line 60 Nd:YAG laser unit supplied by Rofin Sinar at a wavelength of 1064 nm, a marking distance of 0.2 mm and an output of 60 W. A 1.8 mm modem diaphragm was used. Current strength was set at 12 to 18 A and frequencies between 1000 and 8000 Hz. Testing was performed at a marking speed of 300 mm/s.

We claim:

1. Thermoplastic moulding compositions comprising
   A) 99.995 to 30 parts by weight of thermoplastic polymer,
   B) 0.005 to 3 parts by weight of boric anhydride,
   C) 0 to 50 parts by weight of fillers and reinforcing materials,
   D) 0 to 60 parts by weight of flame retardant additives,
   E) 0 to 30 parts by weight of elastomer modifiers,
   F) 0 to 8 parts by weight of antimony trioxide,
   G) 0.4 to 3 parts by weight of copper(II) pyrophosphate hydrate.

2. Thermoplastic moulding composition according to claim 1, wherein polymers or copolymers based on polyalkylene terephthalates, aromatic polyesters, polyamide, polycarbonate, polyacrylate, polymethacrylate, ABS graft polymers, polyolefins, polystyrene, polyvinyl chloride, polyoxymethylene, polyimide, polyethers and polyether ketones individually or as a blend of various polymers, are used as component (A).

3. Thermoplastic moulding compositions according to claim 1, wherein magnesium hydroxide, calcium magnesium carbonate hydrate, halogenated organic compounds, optionally combined with antimony oxides, are used as the flame retardant additives.

4. Thermoplastic moulding compositions according to claim 1, wherein ethylene-1,2-bistetrabromophthalimide, epoxidated tetrabromobisphenol A resin, tetrabromobisphenol A oligocarbonate, pentabromopolyacrylate, brominated polystyrene and/or organic phosphorus compounds are used as halogenated compounds.

5. Mouldings produced from thermoplastic moulding compositions according to claim 1.

* * * * *

UNITED STATES PATENT AND TRADEMARK OFFICE
CERTIFICATE OF CORRECTION

PATENT NO. : 5,840,791
DATED : Nov. 24, 1998
INVENTOR(S) : Herbert Magerstedt et al.

It is certified that error appears in the above-identified patent and that said Letters Patent is hereby corrected as shown below:

Column 4, lines 17 and 22, "$M_w$" should read -- $\overline{M}_w$ --.

**Column 6, line 4, "polyamide or polyamide-6,6" should read -- polyamide-6 or polyamide-6,6 --; and
line 53, "$M_w$" should read -- $\overline{M}_w$ --.**

Column 8, line 38, "poolcarbonate" should read -- polycarbonate --.

Column 9, line 30, "anhydpde" should read -- anhydride --.

Signed and Sealed this

Thirteenth Day of April, 1999

Attest:

Q. TODD DICKINSON

*Attesting Officer*  *Acting Commissioner of Patents and Trademarks*